United States Patent
Sakurai et al.

(10) Patent No.: US 9,821,640 B2
(45) Date of Patent: Nov. 21, 2017

(54) DOOR STRUCTURE FOR VEHICLE

(71) Applicant: TOYOTA JIDOSHA KABUSHIKI KAISHA, Toyota-shi, Aichi-ken (JP)

(72) Inventors: Tomohiro Sakurai, Seto (JP); Tsuyoshi Izuhara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/790,610

(22) Filed: Jul. 2, 2015

(65) Prior Publication Data
US 2016/0001644 A1    Jan. 7, 2016

(30) Foreign Application Priority Data
Jul. 4, 2014  (JP) ................... 2014-138924

(51) Int. Cl.
*B60J 5/04* (2006.01)
*E05D 7/00* (2006.01)

(52) U.S. Cl.
CPC ............. *B60J 5/0468* (2013.01); *B60J 5/045* (2013.01); *B60J 5/0451* (2013.01); *B60J 5/0461* (2013.01); *B60J 5/0463* (2013.01); *B60J 5/0481* (2013.01); *E05D 7/00* (2013.01); *B60J 5/0431* (2013.01)

(58) Field of Classification Search
CPC ........ B60J 5/0468; B60J 5/045; B60J 5/0463; B60J 5/0451; B60J 5/0433; B60J 5/0481
See application file for complete search history.

(56) References Cited

U.S. PATENT DOCUMENTS

| 2,936,050 A | * | 5/1960 | McLaughlin | ..... B32B 17/10045 351/146 |
| 4,416,088 A | * | 11/1983 | Feucht | ................... B60J 5/0463 49/502 |
| 4,651,470 A | * | 3/1987 | Imura | ................... B60J 5/0411 296/146.6 |
| 4,662,115 A | * | 5/1987 | Ohya | ................... B60J 5/0413 49/502 |

(Continued)

FOREIGN PATENT DOCUMENTS

| DE | 3537303 A1 | 4/1987 |
| DE | 4304922 A1 | 8/1994 |

(Continued)

OTHER PUBLICATIONS

Nov. 12, 2015 Extended Search Report issued in European Patent Application No. 15175195.5.

*Primary Examiner* — Gregory Strimbu
(74) *Attorney, Agent, or Firm* — Oliff PLC

(57) ABSTRACT

A door structure includes (i) a door panel including a first wall provided with a hinge member, a second wall, and a first bent part provided between the first wall and the second wall, (ii) a first reinforcing plate including a first part joined to the first wall, a second part joined to the second wall, and a corner part provided between the first part and the second part, and (iii) a second reinforcing plate including a third part joined to the first part, a fourth part joined to the second part, and an intermediate part provided between the third part and the fourth part. The first reinforcing plate and the second reinforcing plate are configured such that a closed space is provided between the first reinforcing plate and the second reinforcing plate.

8 Claims, 9 Drawing Sheets

(56) References Cited

U.S. PATENT DOCUMENTS

| | | | |
|---|---|---|---|
| 4,704,822 A | | 11/1987 | Srock et al. |
| 4,711,052 A | * | 12/1987 | Maeda ................... B60J 5/0405 49/502 |
| 4,831,710 A | * | 5/1989 | Katoh ..................... B60J 5/0406 29/430 |
| 5,233,790 A | * | 8/1993 | Bosotti .................. B60J 5/0469 49/502 |
| 5,857,732 A | * | 1/1999 | Ritchie .................. B60J 5/0416 296/146.11 |
| 6,176,542 B1 | * | 1/2001 | Gooding ................ B60J 5/0416 296/146.5 |
| 6,231,112 B1 | * | 5/2001 | Fukumoto ............. B60J 5/0412 296/146.5 |
| 2002/0073627 A1 | * | 6/2002 | Hock .................... B60J 5/0406 49/502 |

FOREIGN PATENT DOCUMENTS

| | | |
|---|---|---|
| JP | S56-75212 A | 6/1981 |
| JP | S60-104415 A | 6/1985 |
| JP | S62-99209 A | 5/1987 |
| JP | H08-11535 A | 1/1996 |
| JP | H10-59208 A | 3/1998 |
| JP | 2007-216831 A | 8/2007 |

\* cited by examiner

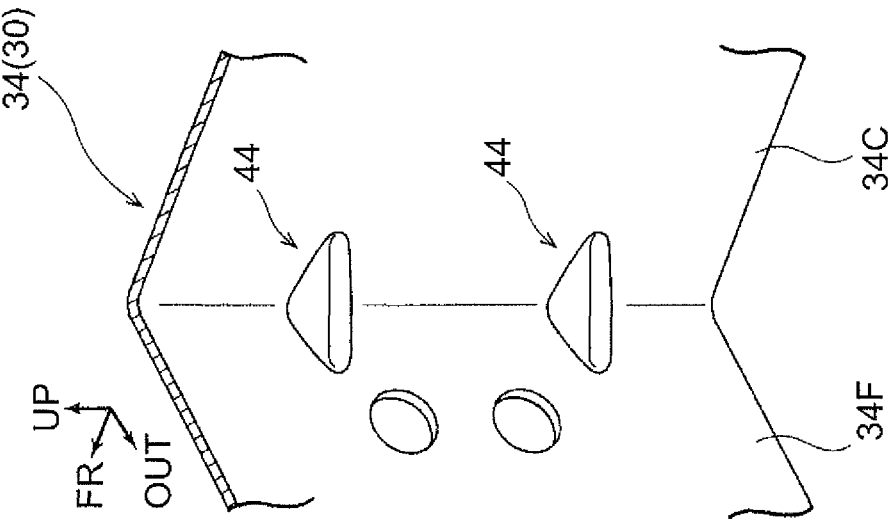
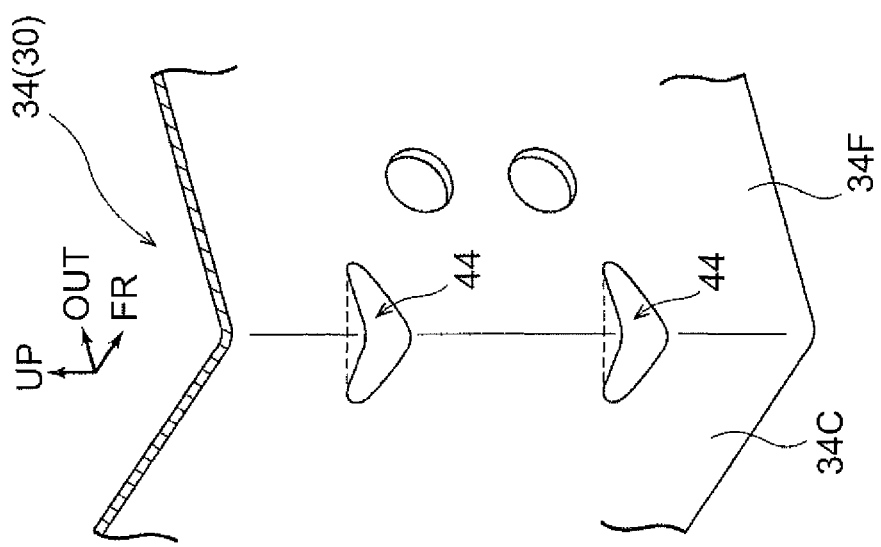

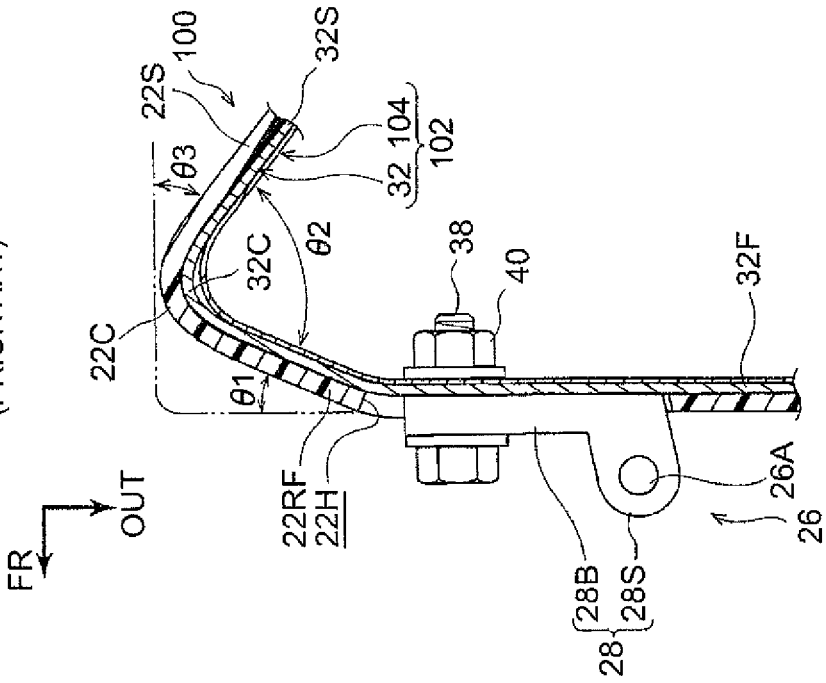
FIG. 5A (PRIOR ART) COMPARATIVE EXAMPLE
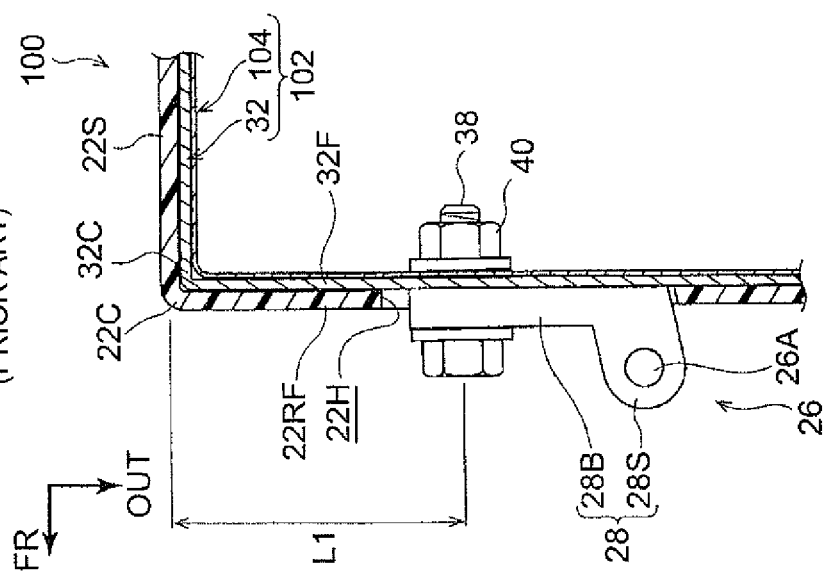
FIG. 5B (PRIOR ART) COMPARATIVE EXAMPLE

DOOR STRUCTURE FOR VEHICLE

INCORPORATION BY REFERENCE

The disclosure of Japanese Patent Application No. 2014-138924 filed on Jul. 4, 2014 including the specification, drawings and abstract is incorporated herein by reference in its entirety.

BACKGROUND OF THE INVENTION

1. Field of the Invention

The invention relates to a door structure for a vehicle.

2. Description of Related Art

There is known a configuration of a side door for a vehicle, in which a reinforcement is provided in a front part of the door on which a side hinge is mounted (for example, Japanese Patent Application Publication No. 2007-216831 (JP 2007-216831 A)).

When a fiber reinforced resin is used as a material for a door panel in order to reduce a weight of a door, there is a concern for insufficient stiffness around a hinge member fixing area of the door. In this perspective there is a room for improvement.

SUMMARY OF THE INVENTION

The invention provides a door structure for a vehicle, which is able to ensure stiffness around a hinge member fixing area without depending on an increase in plate thicknesses of a door panel and a reinforcement.

An aspect of the invention relates to a door structure for a vehicle including a door panel that is made of a fiber reinforced resin and includes a first wall, a second wall, and a first bent part provided between the first wall and the second wall, in which a hinge member is installed on the first wall, and a reinforcement, which is joined to the first wall and the second wall across the first bent part, and has a reinforcement section on a second wall side with respect to the hinge member, and on an inner side of the first bent part.

In this door structure for a vehicle, the hinge member is installed in the door panel, which is made of a fiber reinforced resin, on the first wall side. For example, the hinge member is fixed to the first wall directly or indirectly through the reinforcement. As the reinforcement is joined to the first wall and the second wall of the door panel, the reinforcement section is formed in the door panel on the second wall side and on the inner side of the first bent part. Because of the reinforcement section, a part of the first wall of the door panel, to which load is mainly inputted at the time of, for example, excessive opening, is adjacent to an end part of the reinforcement section on the first wall side, and is closer to the hinge member compared to an end part of the door panel. on the second wall side when there is no reinforcement section made by the reinforcement that is joined to the first and second walls across the first bent part. This means that a bending load (moment), which acts on the first wall due to external force at the time of excessive opening, is reduced.

As stated above, in the foregoing door structure for a vehicle, it is possible to ensure greater stiffness around a hinge member fixing area without depending on an increase in plate thicknesses of the door panel and the reinforcement, compared to a configuration in which, for example, only the first wall is reinforced.

A closed section may be provided on the second wall side with respect to the hinge member as the reinforcement section with the reinforcement, the first wall, the second wall, and the first bent part.

In this door structure for a vehicle, the closed section as the reinforcement section is formed by the reinforcement, which is joined to the first wall and the second wall across the first bent part, the first wall, the second wall, and the first bent part. The closed section makes it possible to ensure stiffness around the hinge member fixing area without depending on the plate thicknesses of the door panel and the reinforcement as stated above.

In the door structure for a vehicle, the reinforcement may include a metallic first reinforcing plate, in which a first part of the first reinforcing plate, and a second part of the first reinforcing plate are respectively joined to the first wall and the second wall on an inner side of the first bent part, and a metallic second reinforcing plate, which is joined to the first and second parts across the corner part. A corner part of the first reinforcing plate may be provided between the first part and the second part. The closed section mat be provided with the first reinforcing plate and the second reinforcing plate.

In this door structure for a vehicle, the foregoing closed section is formed by the part of the door panel where the first reinforcing plate is joined, and the second reinforcing plate. In other words, the closed section, which is formed by the first reinforcing plate and second reinforcing plate that are each made of metal, is joined to the first wall and the second wall of the door panel that is made of a fiber reinforced resin. Therefore, compared to a configuration in which a part of the closed section in a circumferential direction is made only from a fiber reinforced resin, a reinforcing (stiffness improving) effect by the closed section is higher. Therefore, a desired reinforcing effect is obtained while forming (at least one of) the first reinforcing plate and the second reinforcing plate with a light metallic material such as aluminum.

In the door structure for a vehicle, the second reinforcing plate may include an inclined wall that is inclined to the first wall and the second wall, respectively, in a view from a side of an end part of the inclined wall, and connects the first part and the second part with each other linearly.

In this door structure for a vehicle, the inclined wall of the second reinforcing plate extends from the first wall to the second wall linearly (in a shortest distance) in a view from a plate end side (a sectional direction of the closed section). Therefore, compared to a configuration in which, for example, a flexed wall having a flexed part in a middle is provided instead of the inclined wall, it is possible to ensure greater stiffness around the hinge member fixing area with the minimum (mass of the) second reinforcing plate.

The hinge member may be fixed at least to the first part, and the second reinforcing plate may connect an end part of area portion in the first reinforcing plate, to which the hinge member is fixed, on the second wall side, and the second part with each other.

In this door structure for a vehicle, an end part of the closed section on the hinge member side meets or is extremely close to an end part of the hinge member fixing (contact) range on the second wall side in the first reinforcing plate. Therefore, a bending load (moment), which acts on the first wall due to external force at the time of excessive opening, is reduced significantly.

The hinge member may be fastened by a fastening tool to a part of the first wall in which the first reinforcing plate and the second reinforcing plate are superimposed with each other, and a flexed part may be arranged in the second reinforcing plate on the second wall side with respect to the fastening tool. The flexed part is provided between a part that is superimposed with the first reinforcing plate on the first wall side, and the corner part.

In this door structure for a vehicle, the end part of the closed section on the hinge member side is arranged adjacent to the fastening tool that fastens the hinge member in the second reinforcing plate. Therefore, a bending load (moment), which acts on the first wall due to external force at the time of excessive opening, is reduced significantly.

The door structure for a vehicle may further include an auxiliary reinforcement that is provided at least in some of second bent parts of the first reinforcing plate and the second reinforcing plate, which form an interior angle or an exterior angle of the closed section.

In this door structure for a vehicle, the auxiliary reinforcement is provided in the second bent parts of the first wall and the second wall, which form angular parts (an interior angle or an exterior angle) of the closed section. Therefore, compared to the configuration without the auxiliary reinforcement, bending rigidity at a boundary between an area where the closed section is formed and an area where the closed section is not formed, as well as stiffness against sectional collapse of the closed section are improved.

The door panel may have an opening provided in the first wall, and the hinge member may be fastened and fixed to the first reinforcing plate and the second reinforcing plate in a state of being in contact with the first part through the opening.

In this door structure for a vehicle, in the configuration where a fastening load does not act on the door panel made of a fiber reinforced resin, it is possible to ensure stiffness of the hinge member fixing area without depending on the plate thicknesses of the door panel and the reinforcement.

As explained so far, the door structure for a vehicle according to the invention has excellent effects of ensuring stiffness of the hinge member fixing area without depending on the plate thicknesses of the door panel and the reinforcement.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A and FIG. 2B are views showing an entire schematic configuration of a side door to which the side door structure according to the first embodiment of the invention is applied, in which FIG. 2A is a side view that is partially cut out, and FIG. 2B is a sectional view taken along the line 2B-2B in FIG. 2A;

FIG. 3A an FIG. 3B are views showing auxiliary reinforcements of a second reinforcing plate that comprises the side door structure according to the first embodiment of the invention, in which FIG. 3A is a perspective view from an inner side of a flexed part, and FIG. 3B is a perspective view from an outer side of the flexed part;

FIG. 5A and FIG. 5B are views schematically showing a main part of a side door structure according to a comparative example to the embodiment of the invention, in which FIG. 5A is a sectional view before deformation, and FIG. 5B is a sectional view after deformation;

DETAILED DESCRIPTION OF EMBODIMENTS

Figure 1:
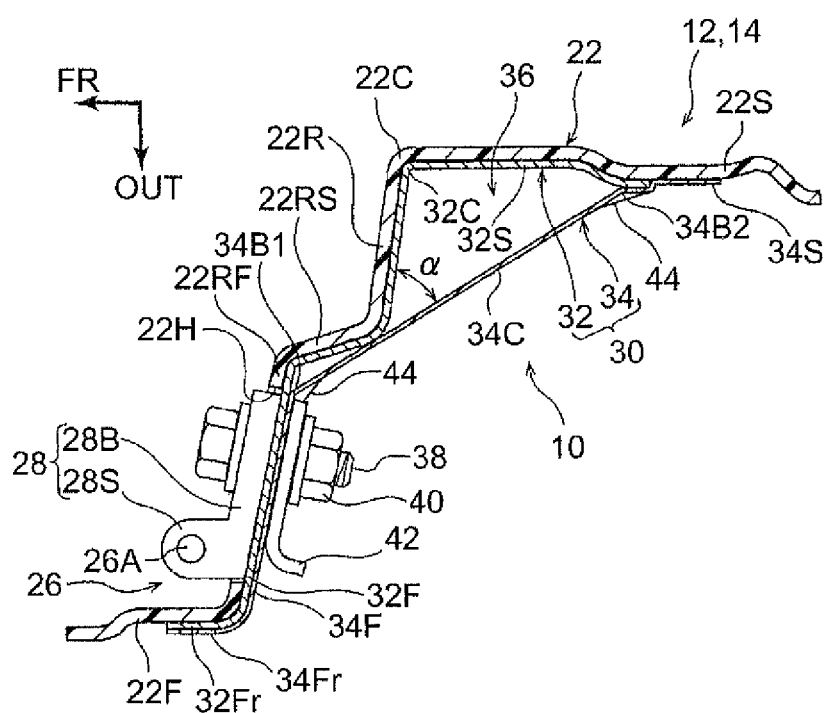
FIG. 1 is a view showing a main part of a side door structure according to the first embodiment of the invention, and is a sectional view taken along the line 1-1 in FIG. 2A.

A side door structure 10 as a door structure for a vehicle according to an embodiment of the invention is explained based on FIG. 1 to FIG. 5B. An arrow FR shown in the drawings where necessary indicates a front direction in a vehicle longitudinal direction, an arrow UP indicates an upper direction in a vehicle vertical direction, and an arrow OUT indicates an outer side in a vehicle width direction. In the explanation below, front and rear, and upper and lower directions indicate front and rear in the vehicle longitudinal direction, and up and down in the vehicle vertical direction, respectively, unless otherwise specified.

Figure 2A:
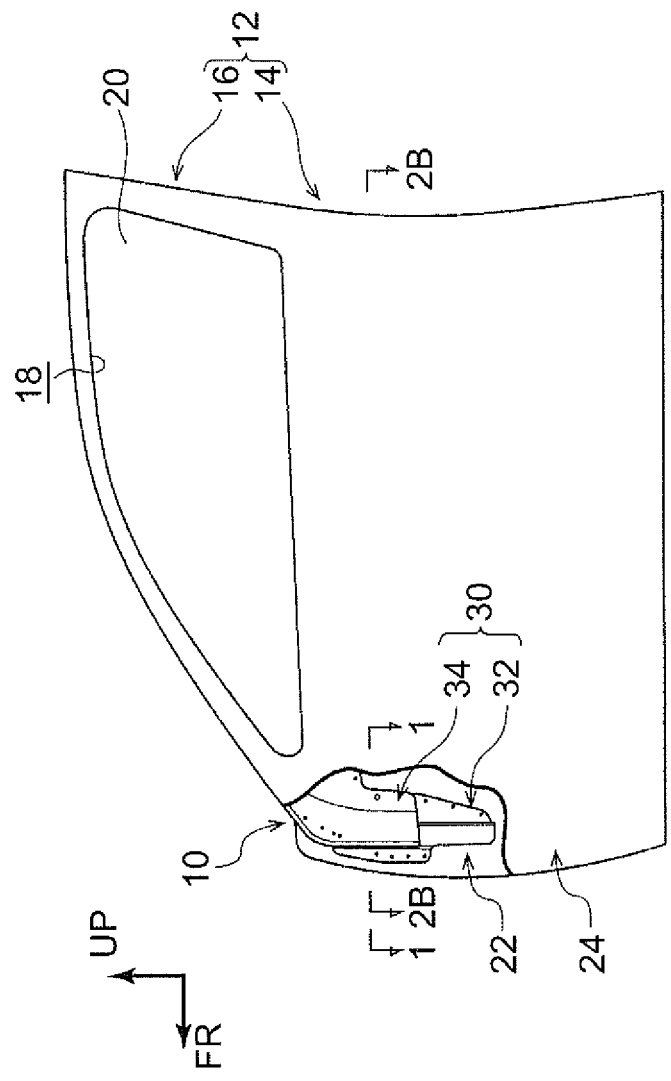
Figure 2B:
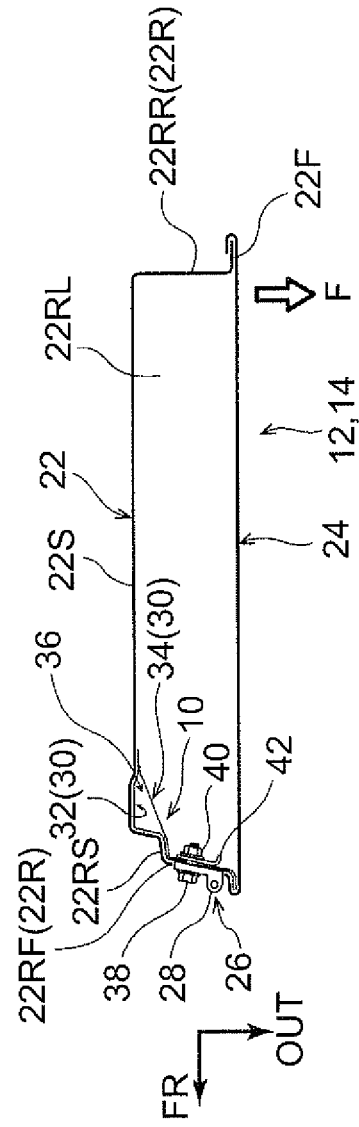

FIG. 2A shows an side view of an entire schematic configuration of a side door 12 of an automobile, to which the side door structure 10 is applied, and FIG. 2B shows a sectional view taken along the line 2B-2B in FIG. 2A. As shown in FIG. 2A, the side door 12 is structured by including a door body 14, and a door frame 16 projecting above an upper end (a belt line) of the door body 14. Side window glass 20 is provided in a window part 18 that is surrounded by the door body 14 and the door frame 16.

As shown in FIG. 2B, the door body 14 is structured by including an inner panel 22 serving as a door panel, and an outer panel 24. The inner panel 22 has a side wall 22S that extends along the front-rear direction and the upper-lower direction, a peripheral wall 22R that extends outwardly in the vehicle width direction from a rim of the side wall 22S, and a flange part 22F that extends from an outer edge of the peripheral wall 22R in the vehicle width direction to an outer side of the peripheral wall 22R. The peripheral wall 22R includes at least a front wall 22RF extending from a front edge of the side wall 22S outwardly in the vehicle width direction, a rear wall 22RR extending from a rear edge of the side wall 22S outwardly in the vehicle width direction, and a lower wall 22RL extending from a lower edge of the side wall 22S outwardly in the vehicle width direction. As shown in an enlarged view in FIG. 1, a step part 22RS is formed in the front wall 22RF.

The inner panel 22 explained above is made from a fiber reinforced resin. In this embodiment, a carbon fiber reinforced resin (herein after, referred to as "CFRP") is employed as a fiber reinforced resin.

Meanwhile, the outer panel 24 forms a design of the side door 12 seen from an outer side of the automobile and is made from metal. In this embodiment, metal that structures the outer panel 24 is aluminum (or an aluminum alloy). A rim part of the outer panel 24 is fixed to the flange part 22F of the inner panel 22 by a hemming structure.

As shown in FIG. 1, the door body 14, or the side door 12, is supported by a side hinge 26 installed in a front part of the side door 12 (the front wall 22RF) so that the side door 12 is able to open and close with respect to a vehicle body (not shown). In this embodiment, a hinge shaft 26A of the side hinge 26 is along the upper-lower direction, and the side door 12 pivots in a horizontal direction to open and close a door opening for ingress and egress.

In the front wall 22RF that structures the door body 14, the side hinge 26 is arranged on an outer side part with respect to the step part 22RS in the vehicle width direction. An inner side part of the front wall 22RF including the step part 22RS in the vehicle width direction serves as a contact surface with a weather strip (not shown) that is provided on the vehicle body side along an inner edge of the door opening.

Explained next is a structure for installing (fixing) a door side member 28 to the door body 14. The door side member 28 serves as a hinge member that is a member of the side hinge 26 on the side door 12 side.

As shown in FIG. 1, the door side member 28 has a base part 28B and a supported part 28S supported by the hinge shaft 26A to be able to rotate. The base part 28B is formed into a plate shape, and the supported part 28S protrudes to the front from an outer side part of the base part 28B in the vehicle width direction. In an inner side part of the base part 28B in the vehicle width direction, a bolt hole (not shown) for fastening is formed.

The door side member 28 is fixed to the front wall 22RF serving as a first wall of the inner panel 22. In this embodiment, the door side member 28 is fixed to the front wall 22RF indirectly through a reinforcement 30. Specific explanation is given below.

The inner panel 22 is provided with the reinforcement 30 for increasing stiffness of a mounting part for the door side member 28 (and its periphery). In this embodiment, an opening 22H is formed in the front wall 22RF of the inner panel 22, and the opening 22H is closed by the reinforcement 30. The door side member 28 is mounted on a part of the reinforcement 30, which closes the opening 22H. In other words, the door side member 28 is fixed to the reinforcement 30, which forms a mounting bearing surface for the door side member 28 on the front wall 22RF, in a state where the door side member 28 is in contact with the reinforcement 30 through the opening 22H.

To be more specific, the reinforcement 30 is structured chiefly from a first reinforcing plate 32 and a second reinforcing plate 34. The first reinforcing plate 32 is formed along an inner surface of the inner panel 22 in a plan view (seen from a plate end side). Specifically, the first reinforcing plate 32 has a side wall 32S that is in contact with the side wall 22S, which serves as a second wall of the inner panel 22, from an outer side in the vehicle width direction, and a front wall 32F that is in contact with the front wall 22RF, which serves as the first wall including the step part 22RS, from the rear side. In this embodiment, the first reinforcing plate 32 further includes a flange part 32Fr that is in contact with the flange part 22F of the inner panel 22 from the outer side in the vehicle width direction. A part of the first reinforcing plate 32, which connects the front wall 32F and the side wall 32S, is regarded as a corner part 32C.

Of the first reinforcing plate 32, the side wall 32S is adhered and fixed to an outer surface of the side wall 22S in the vehicle width direction, and the front wall 32F is adhered and fixed to a rear surface of the front wall 22RF and an outer surface of the step part 22RS in the vehicle width direction. Further, of the first reinforcing plate 32, the flange part 32Fr is adhered and fixed to an outer surface of the flange part 22F in the vehicle width direction.

In this embodiment, an approximately entire surface of the first reinforcing plate 32 is adhered and fixed to the inner panel 22 except the corner part 32C along the inner side of an angular part 22C located between the side wall 22S and the front wall 22RF of the inner panel 22. The angular part 22C of the inner panel 22 can be regarded as a first bent part of the invention. The inner side of the angular part 22C means a side facing the corner part 32C.

As shown in FIG. 2A, an installation range of the first reinforcing plate 32 in a side view is an upper front part of the door body 14. In this embodiment, the invention is employed in a reinforcing structure for a mounting region for the upper side hinge 26, out of a pair of upper and lower side hinges 26 that support the side door 12 with respect to the vehicle body. A mounting region for the lower side hinge 26 is reinforced, for example, together with a mounting structure for an impact beam (not shown).

The second reinforcing plate 34 is joined to the front wall 32F (the front wall 22RF) of the first reinforcing plate 32 and the side wall 32S (the side wall 22S), and forms a closed section 36 on the inner side of the angular part 22C (the corner part 32C). To be specific, the second reinforcing plate 34 includes a front wall 34F fixed to the rear surface of the front wall 32F by adhesion, welding, and so on, a side wall 34S fixed to an outer surface of the side wall 32S in the vehicle width direction by adhesion, welding, and so on, and an inclined wall 34C that connects the front wall 34F and the side wall 34S with each other across the corner part 32C. Thus, the closed section 36 is formed by the front wall 32F of the first reinforcing plate 32 (the front wall 22RF of the inner panel 22), the side wall 32S (side wall 22S), and the inclined wall 34C. In short, connecting the front wall 34F and the side wall 34S with each other across the corner part 32C means that the second reinforcing plate 34 bridges the front wall 34F and the side wall 34S without going through (the vicinity of) the corner part 32C.

Figure 4:
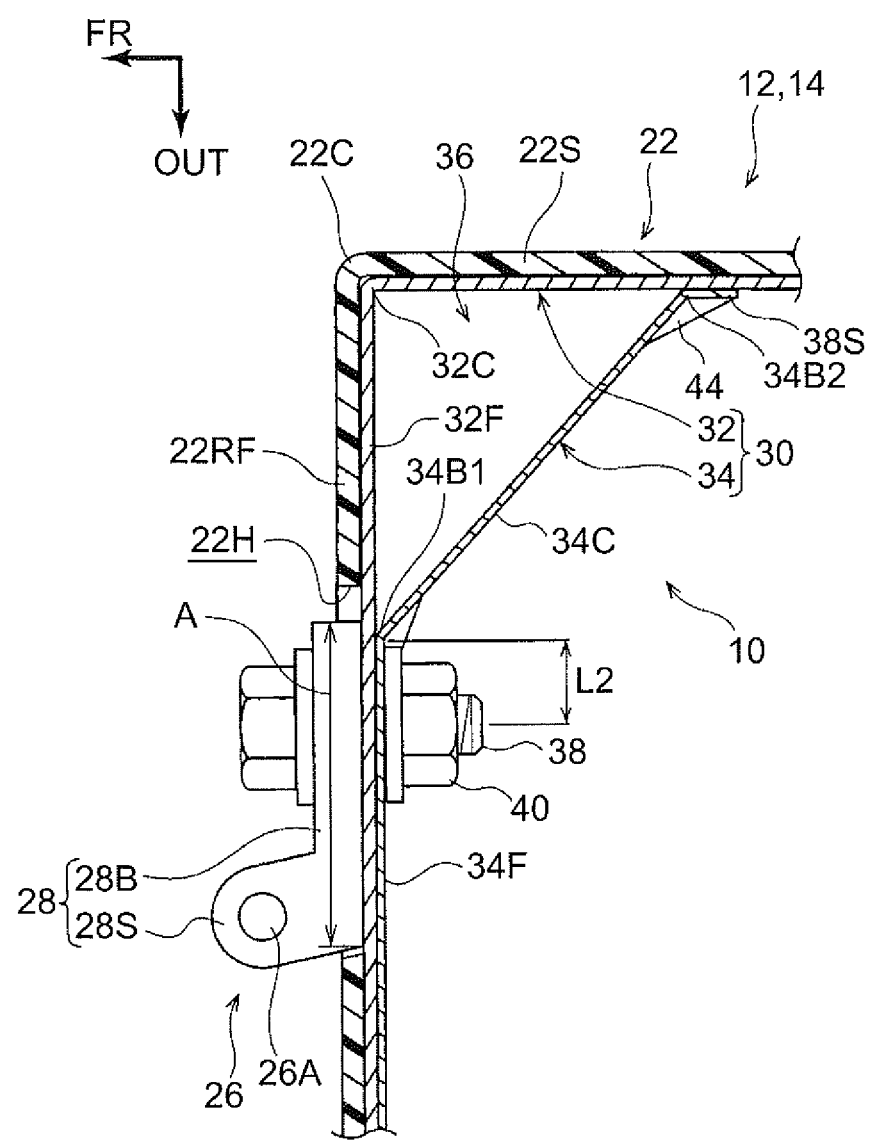
FIG. 4 is a sectional view corresponding to FIG. 1, schematically showing the main part of the side door structure according to the first embodiment of the invention.

The inclined wall 34C in this embodiment connects the front wall 34F and the side wall 34S with each other linearly in a plan view, and is formed into a flat plate shape. As shown in FIG. 4, when schematically shown without illustration of the step part 22RS of the front wall 22RF (32F, 34F), it is understood that the closed section 36 forms a triangle shape in a plan view. In the example in FIG. 1, the closed section 36 is formed into two sections defined by the step part 22RS. The dimension and shape of the step part 22RS vary depending on a vehicle type, and, a configuration having a small step part 22RS is closer to the configuration in FIG. 4 than the configuration in FIG. 1. In this embodiment, the second reinforcing plate 34 further includes a flange part 34Fr that is adhered to an outer surface of the flange part 32Fr of the first reinforcing plate 32 in the vehicle width direction.

By fastening a bolt 38 and a nut 40, the door side member 28 is fixed (installed) to a part of the foregoing reinforcement 30, in which the front wall 32F of the first reinforcing plate 32 and the front wall 34F of the second reinforcing plate 34 are superimposed with each other (the part that closes the opening 22H). In this embodiment, the nut 40 is a weld nut fixed by welding to a plate-shaped retainer 42 that is in contact with the rear surface of the front wall 34F of the second reinforcing plate 34. The retainer 42 can be regarded as a fastening tool in this invention.

The inclined wall 34C of the second reinforcing plate 34 starts from an end part of an inner side in the vehicle width direction (the side wall 22S side) of the mounting bearing surface (an area A in FIG. 4) of the front wall 32F of the first reinforcing plate 32, with which the door side member 28 is in contact, and reaches the side wall 32S of the first reinforcing plate 32, which is joined to the side wall 22S. In this embodiment, a flexed part 34B1, which forms a boundary between the front wall 34F and the inclined wall 34C of the second reinforcing plate 34, is arranged adjacent to an end part of the retainer 42 serving as the fastening tool on the side wall 22S side. In other words, the flexed part 34B1, which forms a base end of the closed section 36 on the front wall 22RF side, is set within a range of the mounting bearing surface for the door side member 28 in the front wall 32F of the first reinforcing plate 32, or in the vicinity of an end part of the inner side of the mounting bearing surface in the vehicle width direction. In short, in the second reinforcing plate 34, a minimum bearing surface (flat surface) required for fastening of the bolt 38 and the nut 40 is ensured in the front wall 34F, and the flexed part 34B1 is set to a position that is just enough to ensure flatness in the end part of the bearing surface on the inner side in the vehicle width direction.

A position of a flexed part 34B2, which forms a boundary between the inclined wall 34C and the side wall 34S is set within a range where an angle α made by the front wall 34F and the inclined wall 34C (see FIG. 1) is 30° or larger and 60° or smaller (30°≤α≤600). Here, the flexed parts 34B1, 34B2 can be collectively regarded as a second bent part.

In the reinforcement 30 explained so far, the first reinforcing plate 32 and the second reinforcing plate 34 are made from metal. In this embodiment, metal that structures the first reinforcing plate 32 and the second reinforcing plate 34 is aluminum (or an aluminum alloy).

The first reinforcing plate 32 and the second reinforcing plate 34 have different plate thicknesses. To be specific, the plate thickness of the first reinforcing plate 32 is larger than the plate thickness t2 of the second reinforcing plate 34. In this embodiment, the plate thickness of the first reinforcing plate 32 is 2 millimeters, and the plate thickness of the second reinforcing plate 34 is 1 millimeter. In this embodiment, a material for the retainer 42 is aluminum (or an aluminum alloy), and a plate thickness of the retainer 42 is 3 millimeters.

In the second reinforcing plate 34, auxiliary reinforcements 44 are formed in the flexed parts 34B1, 34B2 that form exterior angles of the closed section 36. As shown in FIG. 3A and FIG. 3B, the auxiliary reinforcements 44 are formed by denting the flexed parts 34B1, 34B2 of the second reinforcing plate 34 from the outer side (a side with the larger angle) to the inner side. Therefore, the auxiliary reinforcements 44 form triangle shapes protruding to the inner side of the flexed parts 34B1, 34B2 in a plan view. The auxiliary reinforcements 44 are arranged to be offset with respect to the door side member 28 (the retainer 42) in the upper-lower direction, and do not interfere with the door side member 28 (the retainer 42).

In this embodiment, the auxiliary reinforcements 44 in the flexed part 34B1 are formed at a plurality of locations including both upper and lower sides of the door side member 28 (the retainer 42). The auxiliary reinforcements 44 in the flexed part 34B2 are formed at a plurality of locations separated from each other in the upper-lower direction. In this embodiment, each of the auxiliary reinforcements 44 in the flexed part 34B1 and each of the auxiliary reinforcements 44 in the flexed part 34B2 are arranged at same positions (heights) in the upper-lower direction.

Next, operations of the first embodiment are explained.

The side door 12 is supported by the vehicle body through the side hinge 26, and opens and closes the door opening of the vehicle body by pivoting about the hinge shaft 26A.

There are cases where a load acts on the side door 12 by, for example, strong wind and moves the side door 12 in an opening direction (excessively) beyond the limit of opening (herein after, referred to as an "excessive opening"). In a case where a load F (see FIG. 2B) acts on a rear end of the side door 12 and excessive opening happens, a large load is inputted to a part of the side door 12 around a fixing area for the door side member 28 of the side hinge 26. Due to the load, mainly two forms of deformation happen in the side door 12, which are θ1 deformation and θ3 deformation described later, and the θ1 deformation and the θ3 deformation are suppressed by the side door structure 10. Specific explanation is given below.

(θ1 deformation) First of all, θ1 deformation is explained with reference to FIG. 5A and FIG. 5B. A side door 100 in a comparative example shown in FIG. 5A includes a reinforcement 102 instead of the reinforcement 30. The reinforcement 102 is structured chiefly from a first reinforcing plate 32, and a second reinforcing plate 104 that is entirely superimposed on the first reinforcing plate 32. In short, the closed section 36 is not formed in the side door 100. A plate thickness of the second reinforcing plate 104 is equal to a plate thickness of the second reinforcing plate 34. Apart from that, the side door 100 is structured similarly to the side door 12.

In the side door 100 according to the modified example, when load F in an opening direction is applied on the rear end side, a load for pulling a side wall 22S to the rear side (this load is also referred to as a load F for convenience) is inputted to an inner end of a front wall 22RF of an inner panel 22 in the vehicle width direction. Because of the load F, as shown in FIG. 5B, the front wall 22RF receives bending deformation so as to tilt to the rear side, starting from a fastening region for a door side member 28. An amount of the bending deformation of the front wall 22RF can be expressed as angular displacement θ1 that starts from the fastening region for the door side member 28, and the bending deformation will be referred to as θ1 deformation in the explanation below. Angular displacement θ1c in the comparative example is expressed as follows when a distance from the fastening point of the door side member 28 of a side hinge 26 to the side wall 22S is L1 (see FIG. 5A), Young's modulus of the reinforcement 102 is E, and a second area moment of the reinforcement 102 is I: θ1c=−F×L12/(2×E×I).

On the contrary, in the side door 12 to which the side door structure 10 according to this embodiment is applied, θ1 deformation is suppressed compared to the side door 100 according to the comparative example. The operation for suppressing θ1 deformation of the side door 12 is explained by using a schematic model where the step part 22RS, the retainer 42 and so on are not illustrated as shown in FIG. 4.

In the side door structure 10, which is applied to the side door 12, the closed section 36, which reaches the side wall 22S, is formed on the inner side of the door side member 28 in the vehicle width direction. Therefore, load F from the side wall 22S is inputted to the base end of the closed section 36 on the outer side in the vehicle width direction in the front wall 22RF, in other words, to the (vicinity of) flexed part 34B1 of the second reinforcing plate 34. When a distance from the flexed part 34B1 to the fastening point for the door side member 28 of the side hinge 26 is L2 (see FIG. 4), angular displacement θ1e, which is an amount of θ1 deformation in this embodiment, is expressed as follows, where E represents Young's modulus of the reinforcement 30, and I represents a second area moment with respect to bending at the flexed part 34B1: $\theta 1e=-F \times L22/(2 \times E \times I)$ Since L2<L1 (in this embodiment, L2<<L1), in the side door structure 10 according to this embodiment, it is understood that θ1 deformation is more effectively suppressed compared to the comparative example. In other words, the side door structure 10 improves stiffness of the side door 12 against θ1 deformation in contrast with the side door 100 according to the comparative example.

As explained so far, in the side door structure 10 (side door 12) according to the first embodiment, it is possible to ensure greater stiffness around the fixing area for the door side member 28 that structures the side hinge 26, without depending on the plate thicknesses of the inner panel 22 and the reinforcement 30, compared to the foregoing comparative example. Further, compared to the configuration in which only the front wall 22RF is reinforced, it is needless to say that it is possible to ensure greater stiffness around the fixing area for the door side member 28 that structures the side hinge 26, without depending on the plate thicknesses of the inner panel 22 and the reinforcement 30.

Moreover, the flexed part 34B1 of the second reinforcing plate 34 is set within the range of the mounting bearing surface (the area A in FIG. 4) for the door side member 28 in the front wall 32F of the first reinforcing plate 32, or in the vicinity of the end part of the mounting bearing surface on the inner side in the vehicle width direction. In this embodiment, the flexed part 34B1 is arranged adjacent to the end part of the retainer 42, which supports a fastening load of the door side member 28, on the side wall 22S side. Therefore, in the side door structure 10, the foregoing distance L2 is the minimum. Therefore, θ1 deformation of the side door 12 is suppressed even more effectively.

(θ3 deformation) As shown in FIG. 5B, in the side door 100 according to the comparative example, at the time of excessive opening, the side wall 22S is deformed by load F, starting from a front end side (an angular part 22C), so as to be closer to the front wall 22RF. When an angle formed by the side wall 22S and the front wall 22RF after deformation is θ2, and an angle formed by the side wall 22S and the front wall 22RF before deformation is θ0 (90° in the illustrated example), a deformation amount θ3 of the side wall 22S is expressed as follows: θ3=θ0−θ2 (≈90°−θ2). In the explanation blow, this bending deformation will be referred to as θ3 deformation.

In the side door 100 according to the comparative example, it is necessary to increase a plate thickness of one or both of the first reinforcing plate 32 and the second reinforcing plate 104 in order to suppress θ3 deformation of the inner panel 22 made of CFRP having smaller Young's modulus than a metallic material. An increase in a plate thickness causes an increase in mass of the reinforcement 102, which reduces a weight reduction effect of the use of CFRP for the inner panel 22.

On the contrary, in the side door 12, to which the side door structure 10 according to this embodiment is applied, θ3 deformation is suppressed without depending on the thicknesses of the first reinforcing plate 32 and the second reinforcing plate 34. The effect of suppressing θ3 deformation of the side door 12 is explained below by using a schematic model in which the step part 22RS is omitted as shown in FIG. 4.

In order to suppress θ3 deformation in the configuration having the closed section 36, it is effective to suppress bending deformation of the flexed parts 34B1, 34B2, which are section changing parts (parts where stiffness changes abruptly) or external angular parts of the closed section 36, which are apt to become starting points of deformation. In the side door structure 10, the auxiliary reinforcements 44 are formed in the flexed parts 34B1, 34B2 of the second reinforcing plate 34. Therefore, compared to the configuration in which the auxiliary reinforcements 44 are not formed, the flexed parts 34B1, 34B2 of the second reinforcing plate 34 have greater bending rigidity. Therefore, bending of the side door 12, which starts from the flexed parts 34B1, 34B2, is suppressed to a small degree.

Further, in order to suppress θ3 deformation in the configuration having the closed section 36, it is effective to suppress sectional collapse of the closed section 36 itself. In the side door structure 10, since the inclined wall 34C of the second reinforcing plate 34 connects the front wall 34F and the side wall 34S with each other linearly, sectional collapse of the closed section 36 is suppressed more compared to a comparative example in which a flexed part, which is apt to become a starting point of deformation, is provided in a wall connecting the front wall 34F and the side wall 34S with each other. In other words, in this embodiment, θ3 deformation caused by sectional collapse of the closed section 36 (deformation of the angular part 22C) is suppressed.

According to the foregoing, a change in θ2, which is the angle formed by the front wall 22RF and the side wall 22S, is small on the outer side of the closed section 36 in the side door 12, and θ3 deformation is suppressed without depending on the thickness of the second reinforcing plate 34. In particular, the mass is not increased by the auxiliary reinforcements 44 that are formed by denting the second reinforcing plate 34. Therefore, the weight reduction effect by using CFRP for the inner panel 22 is not reduced or inhibited.

In addition, the auxiliary reinforcements 44 are formed on both upper and lower sides with respect to the side hinge 26. Therefore, θ3 deformation is more effectively suppressed compared to the configuration in which the auxiliary reinforcement 44 is formed on either one of upper and lower sides with respect to the side hinge 26.

(Other operating effects) In the side door 12, since the closed section 36 is formed as a reinforcement section, it is possible to obtain an equivalent reinforcing effect with a light weight to that of a configuration in which a solid section, which has the same rim shape as that of the closed section 36, is provided as a reinforcement section (a configuration included in the invention). In particular, since aluminum (or an aluminum alloy) is employed as a metallic material that structures the reinforcement 30, a weight reduction effect by the use of CFRP for the inner panel 22 is not reduced or inhibited compared to the configuration in which, for example, a steel-based metallic material is used.

Moreover, the reinforcement 30 is structured chiefly by the first reinforcing plate 32 and the second reinforcing plate 34. Therefore, the reinforcement 30 is joined to the inner panel 22 through a large area of the first reinforcing plate 32, thereby ensuring joining strength between the reinforcement 30 and the inner panel 22. Then, it is possible to form the closed section 36 by the front wall 22RF and the side wall 22S of the inner panel 22 reinforced by the first reinforcing plate 32, and the second reinforcing plate 34. In other words, the closed section 36 containing the metallic material is formed on the entire circumference, and it is thus possible to say that the closed section 36 is structured by the first reinforcing plate 32 and a second reinforcing plate 34 that are made from metal.

As stated above, since the closed section 36 is formed from a metallic material (aluminum) having higher elasticity than CFRP, stiffness of the side door 12 around a fixing area for the door side member 28 is improved compared to the configuration in which a part of the closed section in a circumferential direction is formed from CFRP only. Also, a reinforcing (stiffness improving) effect by the closed section 36 is greater, thereby providing a necessary reinforcing effect while structuring the first reinforcing plate 32 and the second reinforcing plate 34 from aluminum that is lighter than a steel-based material. In other words, weight is reduced and stiffness is ensured at the same time. Compared to the configuration in which a part of the closed section in the circumferential direction is formed from CFRP only, a small thickness of each part of the side door 12 (the sum of thicknesses of the respective layers) is sufficient, which increases space efficiency within the door body 14.

Further, the inclined wall 34C of the second reinforcing plate 34 forms a straight line in a plan view. Therefore, it is possible to ensure stiffness of the side door 12 around the fixing area for the door side member 28 with a minimum material.

In the side door structure 10, the door side member 28 is fastened and fixed to the reinforcement 30 through the opening 22H formed in the front wall 22RF of the inner panel 22. Therefore, it is possible to mount the door side member 28 on the side door 12 without applying a fastening load to the inner panel 22 made from CFRP.

Next, other embodiments according to the invention will be explained. The configurations and operations, which are basically the same as those of the first embodiment or the embodiment of the prior art, are denoted by the same reference numerals as those of the first embodiment or the embodiment of the prior art, and explanation and illustration thereof are sometimes omitted.

Figure 6:
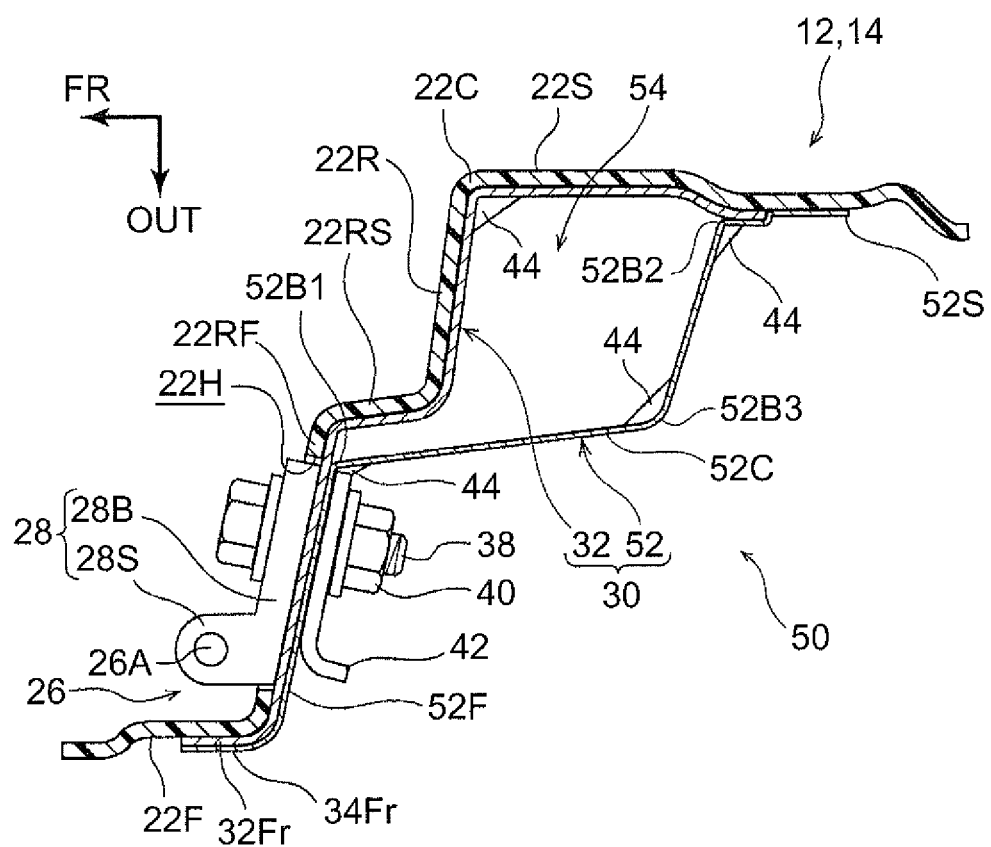
FIG. 6 is a sectional view corresponding to FIG. 1, showing a main part of a side door structure according to the second embodiment of the invention.

FIG. 6 is a sectional view, corresponding to FIG. 1, showing a main part of a side door 12, to which a side door structure 50 as a door structure for a vehicle according to the second embodiment of the invention is applied. As shown in this drawing, the side door structure 50 is different from the side door structure 10 in that a reinforcement 30 is provided with a second reinforcing plate 52 instead of the second reinforcing plate 34 that forms the closed section 36, which is generally triangle in a plan view, with the first reinforcing plate 32.

The second reinforcing plate 52 is joined to a front wall 32F (a front wall 22RF) and a side wall 32S (a side wall 22S) of a first reinforcing plate 32, and forms a closed section 54 into a rectangular shape in a plan view on an inner side of an angular part 22C. To be specific, the second reinforcing plate 52 includes a front wall 52F, which is fixed to the rear surface of the front wall 32F by adhesion, welding and so on, a side wall 52S, which is fixed to an outer surface of the side wall 32S in the vehicle width direction by adhesion, welding, and so on, and a flexed wall 52C, which connects the front wall 52F and the side wall 52S with each other across a corner part 32C.

Thus, as stated above, the closed section 54 is formed in a rectangular shape in a plan view by the front wall 32F of the first reinforcing plate 32 (a front wall 22RF of an inner panel 22), the side wall 32S (the side wall 22S), and the flexed wall 52C. In the second reinforcing plate 52, a flexed part 52B1 that forms a boundary between the front wall 52F and the flexed wall 52C, a flexed part 52B2 that forms a boundary between the flexed wall 52C and the side wall 52S, and a flexed part 52B3 of the flexed wall 52C are formed. The flexed parts 52B1, 52B2 are arranged similarly to the flexed parts 34B1, 34B2 of the first embodiment.

In this embodiment, auxiliary reinforcements 44 are formed in each of the flexed parts 52B1, 52B2, 52B3. The auxiliary reinforcements 44 in the flexed part 52B1 are formed at a plurality of locations including both upper and lower sides with respect to a door side member 28 (a retainer 42). The auxiliary reinforcements 44 in the flexed parts 52B2, 52B3 are formed at a plurality of locations separated from each other in the upper-lower direction. In this embodiment, each of the auxiliary reinforcements 44 in the flexed part 52B1, and each of the auxiliary reinforcements 44 in the flexed parts 52B2, 52B3 are arranged at same positions (heights) in the upper-lower direction.

Further, in this embodiment, the auxiliary reinforcements 44 are formed in the corner part 32C of the first reinforcing plate 32. In other words, the auxiliary reinforcements 44 are formed in each one of four angular parts of the closed section 54 that forms the rectangular shape in a plan view (the flexed parts 52B1, 52B2 that form exterior angles of the closed section 54, the flexed part 52B3 that forms the interior angle, and the corner part 32C). Here, the flexed parts 52B1 to 52B3 and the corner part 32C can be collectively regarded as the second bent parts. The rest of the configuration of the side door structure 50, including the parts that are not illustrated, is the same as the corresponding configuration of the side door structure 10.

Therefore, with the side door structure 50, it is also possible to obtain similar effects by operations similar to those of the side door structure 10, except the operation effect obtained by providing the inclined wall 34C in the second reinforcing plate 34, which forms a straight line in a plan view (and the closed section 36 forms a triangle shape).

In the side door structure 50, the auxiliary reinforcements 44 are formed in each of the flexed parts 52B1, 52B2, 52B3 of the second reinforcing plate 52 that structures the closed section 54 having a rectangular shape. Therefore, sectional collapse is suppressed in a sectional shape that is more susceptible to sectional collapse (so-called matchbox deformation) compared to the closed section having a triangle shape in a plan view. In particular, the auxiliary reinforcements 44 are also formed in the corner part 32C of the first reinforcing plate 32 that forms the closed section 54 with the second reinforcing plate 52. Therefore, sectional collapse of the closed section 54 is suppressed even more effectively. Therefore, with the side door structure 50, 83 deformation caused by sectional collapse of the closed section 54 (deformation of the angular part 22C) is also suppressed.

Third Embodiment

Figure 7:
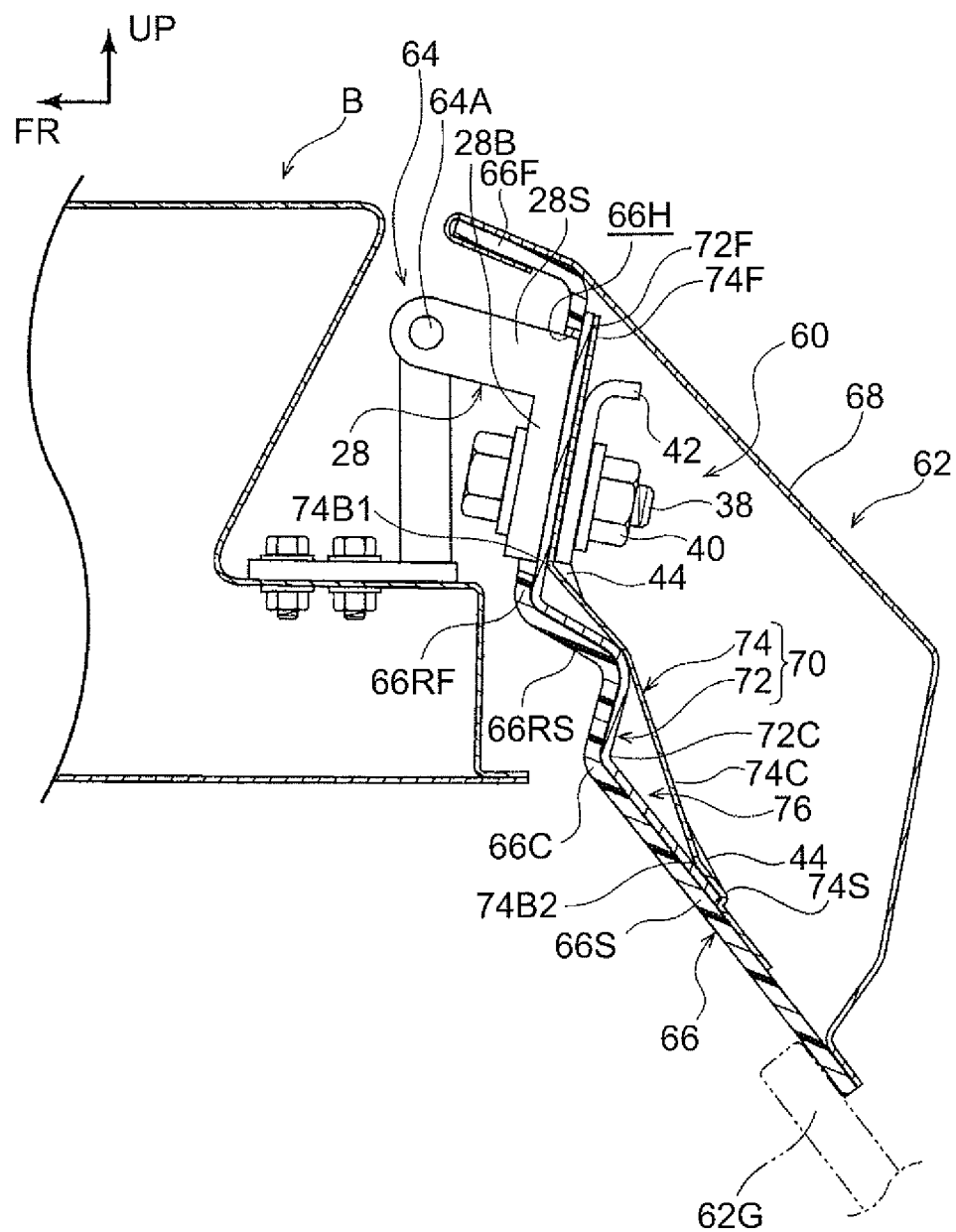
FIG. 7 is a side sectional view showing a main part of a back door structure according to the third embodiment of the invention.

FIG. 7 is a side sectional view showing a main part of a back door structure 60 as a door structure for a vehicle according to the third embodiment of the invention. FIG. 7 mainly shows a part of a back door 62 of an automobile, to which the back door structure 60 is applied, above an upper end of a back window glass 62G. As shown in this drawing, an upper end part the back door 62 is supported by a back door hinge 64 so that the back door 62 is able to open and close a back gate with respect to a vehicle body B. In this embodiment, a hinge shaft 64A of the back door hinge 64 is along the vehicle width direction, and the back door 62 pivots in the upper-lower direction so as to open and close the back gate.

The back door 62 is provided with an inner panel 66, which is made of CFRP and serves as a door panel. The inner panel 66 includes a side wall 66S, which is inclined with respect to the upper-lower direction so that an upper end side is positioned in front of a lower end side in a side sectional view, a front wall 66RF, which extends upwardly from an upper front edge of the side wall 66S, and a flange part 66F, which extends frontward from an upper edge of the front wall 66RF. The front wall 66RF can be regarded as a first wall of the invention, and the side wall 66S can be regarded as a second wall of the invention. A step part 66RS is formed in the front wall 66RF.

The back door 62 is provided with a metallic outer panel 68. The outer panel 68 is joined to the inner panel 66 and structures a back door body having a closed section structure, together with the inner panel 66. FIG. 7 shows the closed section structure on an upper end side, which is positioned above the back window glass 62G and extends in the vehicle width direction. Metal that structures the outer panel 68 is aluminum (or an aluminum alloy).

(Hinge mounting structure) Next, a structure for mounting (fixing) a door side member 28 on the door body 14 is explained. The door side member 28 serves as a hinge member that is a member of the back door hinge 64 on the back door 62 side.

The inner panel 66 is provided with a reinforcement 70 for increasing stiffness of a mounting part (and its periphery) for the door side member 28 in the back door hinge 64. In this embodiment, an opening 66H, which is closed by the reinforcement 70, is formed in the front wall 66RF of the inner panel 66, and the door side member 28 is mounted on a part of the reinforcement 70 that closes the opening 66H. The reinforcement 70 is structured chiefly from a first reinforcing plate 72 and a second reinforcing plate 74.

The first reinforcing plate 72 includes a side wall 72S and a front wall 72F. The side wall 72S is adhered to an outer surface of the side wall 66S in the vehicle width direction, the side wall 66S serving as a second wall of the inner panel 66. The front wall 72F is adhered to a rear surface of the front wall 66RF serving as a first wall including the step part 66RS. A part of the first reinforcing plate 72 between the side wall 72S and the front wall 72F is regarded as a corner part 72C.

In this embodiment, an approximately entire surface of the first reinforcing plate 72 is adhered and fixed to the inner panel 66 except the corner part 72C that is present along an inner side of an angular part 66C located between the side wall 66S and the front wall 66RF of the inner panel 66. Here, the angular part 66C of the inner panel 66 can be regarded as the first bent part of the invention.

The second reinforcing plate 74 is joined to the front wall 72F (the front wall 66RF) and the side wall 72S (the side wall 66S) of the first reinforcing plate 72, and forms a closed section 76 on the inner side of the angular part 66C. To be specific, the second reinforcing plate 74 includes a front wall 74F, which is fixed to a rear surface of the front wall 72F by adhesion, welding, and so on, a side wall 74S, which is fixed to an outer surface of the side wall 72S in the vehicle width direction by adhesion, welding, and so on, and an inclined wall 74C that connects the front wall 74F and the side wall 74S with each other across the corner part 72C.

Thus, the closed section 76 is formed by the front wall 72F of the first reinforcing plate 72 (the front wall 66RF of the inner panel 66), the side wall 72S (the side wall 66S), and the inclined wall 74C. In this embodiment, although being slightly curved so as to avoid interference with the step part 66RS of the inner panel 66, the inclined wall 74C forms a generally flat plate shape (a linear shape in a view from the plate end side) as a whole. Therefore, the closed section 76 in this embodiment is formed so as to be divided by the step part into two closed sections having triangle shapes in a side view.

The door side member 28 is fastened and fixed by a bolt 38 and a nut 40 to a part where the front wall 72F of the first reinforcing plate 72 and the front wall 74F of the second reinforcing plate 74 of the reinforcement 70 explained above are superimposed with each other (a part that closes the opening 66H). In this embodiment, metal that structures the first reinforcing plate 72 and the second reinforcing plate 74 is aluminum (or an aluminum alloy).

The inclined wall 74C of the second reinforcing plate 74 explained above starts from an end part of a mounting bearing surface of the front wall 72F of the first reinforcing plate 72 on an inner side (the side wall 66S side) in the vehicle width direction, in which the door side member 28 is in contact with the mountain bearing surface. Then, the inclined wall 74C reaches the side wall 72S of the first reinforcing plate 72, which is joined to the side wall 66S. In this embodiment, a flexed part 74B1, which forms a boundary between the front wall 74F and the inclined wall 74C in the second reinforcing plate 74, is arranged adjacent to an end part of a retainer 42, which serves as a fastening tool, on the side wall 66S side. In other words, the flexed part 74B1 that forms a base end of the closed section 76 on the front wall 66RF side is set within a range of the mounting bearing surface that is provided in the front wall 72F of the first reinforcing plate 72 for the door side member 28, or adjacent to the end part of the mounting bearing surface on the inner side in the vehicle width direction. In short, a minimum bearing surface (flat surface) in the second reinforcing plate 74 required for fastening the bolt 38 and the nut 40 stated above is ensured in the front wall 74F, and the flexed part 74B1 is set to be close to a position that is just enough to ensure flatness in the end part of the bearing surface on the inner side in the vehicle width direction.

An auxiliary reinforcement 44 is formed in the flexed part 74B1 that forms an exterior angle of the closed section 76. The auxiliary reinforcement 44 is also formed in a flexed part 74B2 that forms a boundary between the side wall 74S and the inclined wall 74C in the second reinforcing plate 74, or an exterior angle of the closed section 76. The flexed parts 74B1, 74B2 can be collectively regarded as the second bent parts.

In the back door structure 60 according to this embodiment, although an opening and closing direction about the hinge shaft 64A is different from that of the side door structure 10, similar effects are obtained by operations (mechanism) that are basically similar to those of the side door structure 10.

MODIFIED EXAMPLES

First Modified Example

Figure 8:
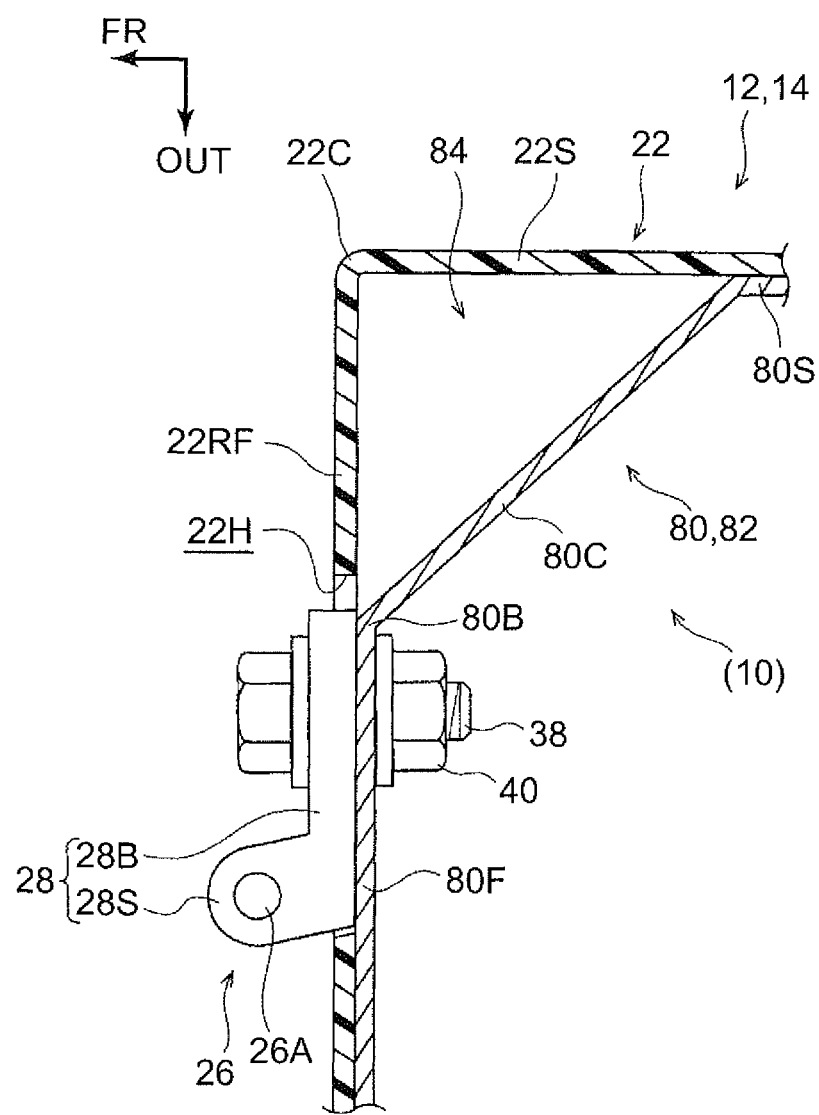
FIG. 8 is a sectional view schematically showing a side door structure according to the first modified example of the embodiment of the invention.

In each of the embodiments stated above, the example is shown in which the reinforcement is structured chiefly by the first reinforcing plate and the second reinforcing plate. However, the invention is not limited to this. For example, as schematically shown in FIG. 8, a configuration may be used, in which a closed section 84 serving as the reinforcement section is formed by a reinforcement 82 that is made chiefly from a single reinforcing plate 80.

The reinforcing plate 80 has a shape similar to that of the second reinforcing plate 34 in a plan view. In the reinforcing plate 80, a front wall 80F is joined to a front wall 22RF, a side wall 80S is joined to a side wall 22S, and an inclined wall 80C connects the front wall 80F and the side wall 80S across an angular part 22C. Accordingly, in this modified example, the closed section 84 having a generally triangle shape in a plan view is formed by the front wall 22RF and the side wall 22S of the inner panel 22 made of CFRP, and the reinforcing plate 80. Connecting the front wall 80F and the side wall 80S across the angular part 22C means that the reinforcing plate 80 bridges the front wall 80F and the side wall 80S without going through (the vicinity of) the angular part 22C.

In this modified example, similar effects are obtained by operations similar to those of the side door structure 10, except the operation effect obtained by structuring the reinforcement 30 chiefly by the first reinforcing plate 32 and either one of the second reinforcing plates 34, 52. By forming the auxiliary reinforcement 44 in each flexed part 80B of the reinforcing plate 80, it is possible to obtain similar effects from operations similar to those of the side door structure 50. In this modified example, the reinforcing plate 80 may also have a similar shape to that of second reinforcing plate 52, thereby forming a rectangular closed section in a plan view.

Second Modified Example

Figure 9:
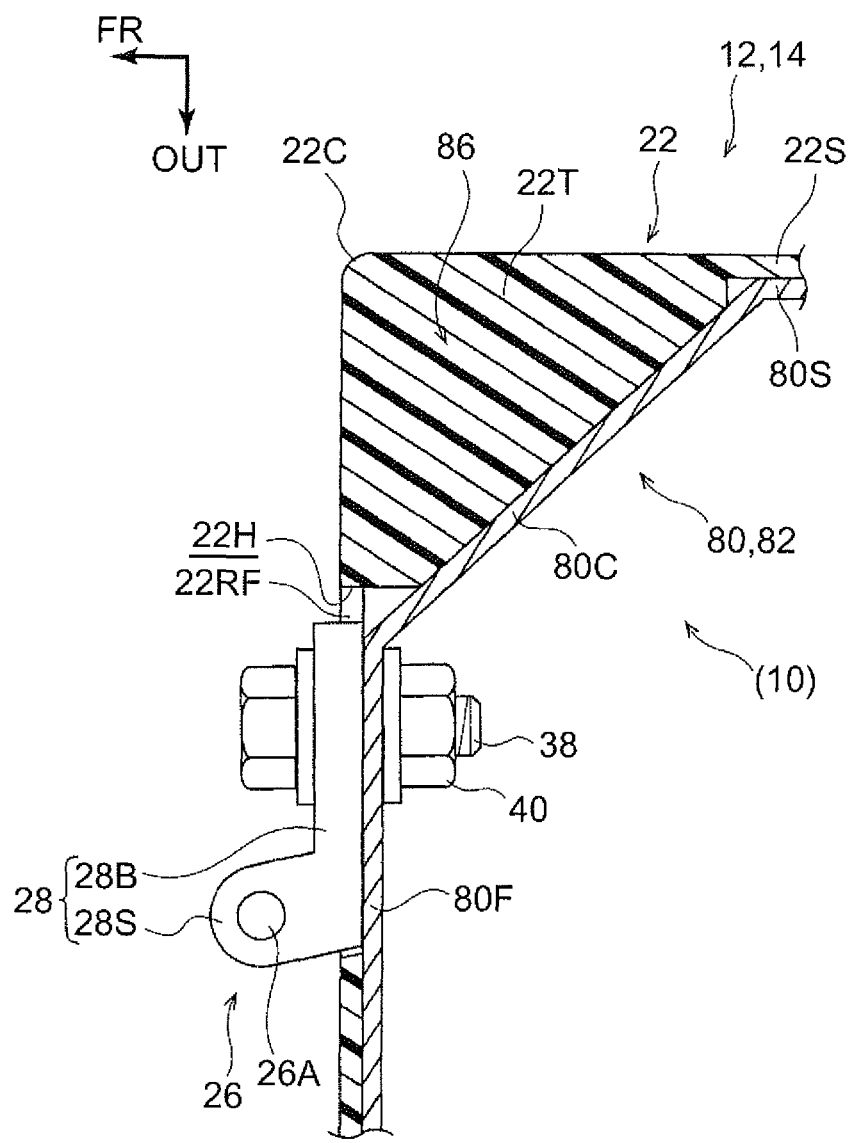
FIG. 9 is a sectional view schematically showing a side door structure according to the second modified example of the embodiment of the invention.

In each of the embodiments and the modified example stated above, the examples are explained in which the closed sections are formed as the reinforcement sections by the reinforcements 30, 70, 82. However, the invention is not limited to this. This means that it is only required that the reinforcement according to the invention forms the reinforcement section by being joined to the front wall 22RF and the side wall 22S across the angular part 22C of the inner panel 22. Therefore, for example, as shown schematically in FIG. 9, a configuration may be employed, in which a thick part 22T of the inner panel 22 is in contact with (or adhered to) the inclined wall 80C, thereby forming a solid section 86 as the reinforcement section.

Other Modified Examples

Yet further, in each of the foregoing embodiments and modified examples, the examples are described in which the inner panel 22 is made of CFRP. However, the invention is not limited to this. For example, the inner panel 22 made of a fiber reinforced resin using glass or Kevlar as a reinforced fiber may be employed. On the other hand, the reinforcements 30, 70 are not limited to aluminum, and various types of metallic materials may be used. In the configuration in which the reinforcements 30, 70 include the first and second reinforcing plates, different metallic materials may be used to make the first and second reinforcing plates. The reinforcement 82 is not limited to a metallic material, and may be structured by using, for example, a fiber reinforced resin.

In each of the foregoing embodiments and modified examples, the examples are described in which the invention is applied to a side door with a front hinge, and a back door with an upper hinge. However, the invention is not limited to this. The invention may also be applied to, for example, a side door with a rear hinge, a side door with an upper hinge (a so-called gull wing door), a back door with a side hinge, and a lower part of a back door with a lower hinge.

In each of the foregoing embodiments and modified examples, the examples are described in which the closed sections 36, 54, 76 have a hollow structure in each part. However, the invention is not limited to this. For example, a configuration may be used in which a rib is arranged inside a closed section. The rib may close the entire closed section, connect a plurality of walls that form a closed section (push against the walls so as to suppress deformation), or be provided in, for example, one of the walls (to increase a section modulus).

In the foregoing embodiments, the examples are explained in which the angular parts 22C, 66C are formed as the bent parts between the first walls (the front walls 22RF, 66RF) and the second walls (the side walls 22S, 66S), respectively. However, the invention is not limited to this. For example, a configuration may be used in which a round-shaped part (a bent part having a larger radius of curvature than that of the angular part) is formed as the bent part between the first wall and the second wall.

In the foregoing embodiments, the examples are described in which the auxiliary reinforcements 44 are formed in each of the reinforcements that structure the closed sections 36, 54, 76. However, the invention is not limited to this. For example, a configuration may be used in which θ3 deformation is suppressed by a rib and so on instead of the auxiliary reinforcements 44. However, as a configuration that suppresses θ3 deformation, it is preferred to form the auxiliary reinforcements 44 that improve stiffness against θ3 deformation without increasing a mass. Also, arrangement, dimension and shape, number, and so on of the auxiliary reinforcements 44 are not limited to the foregoing embodiments, and may be set as appropriate to comply with demands. Further, in the first and third embodiments, it is needless to say that the auxiliary reinforcements may be provided in the corner parts 32C, 72C.

In each of the foregoing embodiments and modified examples, the examples are described in which the base ends of the closed sections 36, 54, 76, 84, and the solid section 86 on the sides of the front walls 22RF, 66RF are adjacent to the fastening region (retainer 42) fastened by the bolt 38 and the nut 40 on the sides of the side walls 22S, 66S. However, the invention is not limited to this, and the reinforcement section only needs to be formed in the first wall by a reinforcement that goes across the angular part 22C on the side closer to the second wall than the hinge member. Therefore, for example, in a configuration having the step parts 22RS, 66RS of the inner panels serving as door panels, the closed sections 36, 54, 76 and so on may be structured so that parts where the first and second reinforcing plates are superimposed with each other in the step parts 22RS, 66RS become base ends of the closed sections. In each of the foregoing embodiments and modified examples, in a configuration without the retainer 42, it is only necessary to decide where to arrange the base end of the closed section 36 and so on (the flexed part of the reinforcement) based on the (head of the) bolt 38, and the nut, serving as the fastening tools.

In each of the foregoing embodiments and the modified examples, the examples are described in which the reinforcements 30, 70, 82 (the first reinforcing plates 32, 72, the second reinforcing plates 34, 52, 74, and the reinforcing plate 80) are provided as parts for exclusive use. However, the invention is not limited to this. For example, the reinforcements 30, 70, 82 may be structured with other functions, or may be structured integrally with other functional parts (for example, components of the door frame 16).

In the example that the invention is applied to the side door structure, the invention is applied to the mounting part for the upper side hinge 26 out of the upper and lower side hinges 26. However, the invention is not limited to this. For example, the invention may be applied to the mounting part for the lower side hinge 26, and the invention may be applied to the mounting parts of the upper and lower side hinges 26, respectively. In the latter example, reinforcing structures of the mounting parts for the upper and lower side hinges 26 may be structured integrally with each other.

In addition, it goes without saying that it is possible to carry out the invention with various changes that are made without departing from the gist of the invention. For example, the reinforcing structure may be made by combining the structures (elements) of the foregoing modified examples.

What is claimed is:

1. A door structure for a vehicle comprising:
   a door panel that is made of a fiber reinforced resin,
      the door panel including a first wall provided with a hinge member, a second wall, and a first bent part provided between the first wall and the second wall;
   a first reinforcing plate that is made of a metal,
      the first reinforcing plate including a first part engaging to the first wall, a second part engaging to the second wall, and a corner part provided between the first part of the first reinforcing plate and the second part; and
   a second reinforcing plate that is made of a metal,
      the second reinforcing plate including a third part engaging to the first part of the first reinforcing plate, a fourth part engaging to the second part, and an intermediate part provided between the third part and the fourth part, wherein
   the second reinforcing plate includes an end that engages the second part of the first reinforcing plate and extends beyond the second part of the first reinforcing plate to engage the second wall of the door panel,
   the first reinforcing plate and the second reinforcing plate are configured such that, in a plan view, a closed space is defined between the first reinforcing plate and the second reinforcing plate,
   the door panel has an opening provided in the first wall, and
   the hinge member is fastened and fixed to the first reinforcing plate and the second reinforcing plate through the opening and contacts the first part of the first reinforcing plate without applying a load to the first wall.

2. The door structure for a vehicle according to claim 1, wherein
   the intermediate part of the second reinforcing plate is a flat plate.

3. The door structure for a vehicle according to claim 1, wherein
   the hinge member is fixed at least to the first part of the first reinforcing plate and the third part of the second reinforcing plate.

4. The door structure for a vehicle according to claim 1, wherein
   the hinge member is connected to the first wall by a plate retainer, the first reinforcing plate and the second reinforcing plate being superimposed with each other, and
   the second reinforcing plate includes a flexed part that is arranged adjacent to the plate retainer.

5. The door structure for a vehicle according to claim 1, wherein the first reinforcing plate and the second reinforcing plate, include auxiliary reinforcements.

6. The door structure for a vehicle according to claim 1, wherein
   an angle formed by the first wall and the second wall is smaller than 180 degrees.

7. The door structure for a vehicle according to claim 6, wherein
   the angle formed by the first wall and the second wall is about 90 degrees.

8. The door structure for a vehicle according to claim 1, wherein
   the hinge member is connected to the first wall by a plate retainer, the first reinforcing plate and the second reinforcing plate being superimposed with each other.

* * * * *